(12) United States Patent
Lohss

(10) Patent No.: US 6,899,213 B1
(45) Date of Patent: May 31, 2005

(54) BRAKE-TRANSMISSION INTERLOCK DEVICE

(75) Inventor: Kurt L. Lohss, Pentwater, MI (US)

(73) Assignee: Lankfer Diversified Industries, Inc., Grand Rapids, MI (US)

( * ) Notice: Subject to any disclaimer, the term of this patent is extended or adjusted under 35 U.S.C. 154(b) by 0 days.

(21) Appl. No.: 09/952,415

(22) Filed: Sep. 11, 2001

Related U.S. Application Data

(60) Provisional application No. 60/242,316, filed on Oct. 20, 2000.

(51) Int. Cl.⁷ .............................................. B60K 41/26
(52) U.S. Cl. ................................................... 192/220.3
(58) Field of Search ........................... 192/220.3, 220.4, 192/220.5

(56) References Cited

U.S. PATENT DOCUMENTS

| | | | | |
|---|---|---|---|---|
| 3,638,759 A | * | 2/1972 | Englhardt | 182/194 |
| 3,885,669 A | * | 5/1975 | Potucek | 206/338 |
| 5,036,962 A | * | 8/1991 | Amagasa | 180/271 |
| 5,127,245 A | * | 7/1992 | Imai et al. | 192/219.4 |
| 5,135,415 A | * | 8/1992 | Huber | 439/716 |
| 5,251,723 A | * | 10/1993 | Rolinski et al. | 192/220.4 |
| 5,314,049 A | * | 5/1994 | Nordstrom | 180/271 |
| 5,494,141 A | * | 2/1996 | Osborn et al. | 192/220.4 |
| 5,575,309 A | * | 11/1996 | Connell | 137/554 |
| 5,647,465 A | * | 7/1997 | Burkhard et al. | 192/220.2 |
| 5,662,001 A | * | 9/1997 | Smale | 477/99 |
| 5,759,132 A | * | 6/1998 | Osborn et al. | 192/220.4 |
| 5,862,899 A | * | 1/1999 | Dahlstrom | 192/220.4 |
| 5,924,540 A | * | 7/1999 | Kim | 192/220.4 |
| 5,938,562 A | * | 8/1999 | Withey | 192/220.3 |
| 5,954,535 A | * | 9/1999 | Lawrence | 439/439 |
| 6,070,749 A | * | 6/2000 | Joulia | 220/4.22 |
| 6,223,380 B1 | * | 5/2001 | Klima et al. | 15/118 |
| 6,308,813 B1 | * | 10/2001 | Carlson | 188/267.1 |

* cited by examiner

Primary Examiner—Robert A. Siconolfi
Assistant Examiner—Melanie Torres
(74) Attorney, Agent, or Firm—Van Dyke, Gardner, Linn & Burkhart, LLP

(57) ABSTRACT

A brake-transmission interlock device includes a housing which is slidably positioned over the exterior surface of a solenoid. A connector member extends from the exterior surface of the housing, and at its end, is pivotally connected to a lever arm having a blocking member which maintains the shifter of an automatic transmission vehicle in the park position unless the operator simultaneously depresses the brake foot pedal. The lever arm is operably connected to the solenoid drive member, and when in the retracted position, enables the shifter to be moved along the shift gate. The housing and connector member are integrally formed to thereby decrease the number of parts necessary for manufacturing. By attaching the lever arm to the connector member extending from the housing reduces the noise associated with the pivotal movement of the lever arm and increases the precision with which the lever arm is moved to and from the retracted position.

20 Claims, 6 Drawing Sheets

BRAKE-TRANSMISSION INTERLOCK DEVICE

This application claims priority from provisional application entitled BRAKE-TRANSIMSSION INTERLOCK DEVICE, Ser. No. 60/242,316, filed Oct. 20, 2000, the disclosure of which is incorporated by reference herein in its entirety.

BACKGROUND OF THE INVENTION

The present invention relates generally to brake-transmission interlock devices for automatic transmission vehicles.

In vehicles operated by an automatic transmission, a gear shift lever is used to alter the position of the transmission gears in order to alter the operating position of the vehicle. Normally, in standard automatic transmissions, the gear shift lever enables the operator to shift the vehicle between the following positions: park, reverse, neutral, drive, second or first.

In order to enhance the safety of automatic transmission vehicles, the industry has advanced several brake-transmission interlock devices, normally actuated by a solenoid. These brake-transmission interlock devices are attached to a shifter base while the solenoid is attached to a separate lever arm.

The purpose of the brake-transmission interlock device is to prevent an operator from shifting the gear shift lever from the park position unless the operator is simultaneously depressing the brake pedal which controls the vehicle's power brakes. Preventing the operator from shifting the vehicle from the park position unless the brake foot pedal is applied prevents the vehicle from inadvertently accelerating in either a forward direction or a reverse direction depending upon the chosen gear. Thus, as the vehicle is moved out of the park position, the transmission-brake interlock device assures that the vehicle is maintained in a stationary position. This stationary position prevents accidents with other vehicles, and/or injury to individuals within the vicinity of the vehicle.

In normal operation, the solenoid is in electrical communication with a control mechanism operably connected to the brake system. When the vehicle is in the park position, the shift lever is maintained in a particular position or notch within the shifter base. When the brake foot pedal is not depressed, the solenoid is in a first position whereby the solenoid drive member maintains the lever arm in a blocking position, and prohibits the shifter from being moved out of the park position. Upon depression of the brake foot pedal, the solenoid is actuated to move the drive member into a second or release position which in turn orients the lever arm so as to enable the shifter to be moved from the park position.

One problem associated with the use of existing brake-transmission interlock devices is the noise associated when the solenoid drive member moves the lever arm to and from the release position. Given the manufacturing tolerances between the solenoid, the lever arm and the shifter base, when the lever arm is moved into the release position, a clicking sound is normally encountered. This clicking sound detracts from the smooth movement of the shifter from the park position and reduces from the perceived quality of the vehicle.

Furthermore, given the separate lever arm and solenoid, over time, manufacturing tolerances have a tendency to reduce the precision with which the brake-transmission interlock device operates. Often, this lack of precision requires replacement or repair, thereby adding cost to the operation of the vehicle. In addition, the use of a separate lever arm increases manufacturing costs.

The solenoid is normally attached to the shifter base by means of pair of thread screws or like fasteners bolted to the shifter base. These fasteners also increase the cost of the brake-transmission interlock device and may loosen during operation, thereby decreasing the precision with which the brake-transmission interlock device functions.

Accordingly, there exists a need for a brake-transmission interlock device having an integrated lever, which is easy to manufacture, install and provides precision movement throughout the life of the vehicle.

SUMMARY OF THE INVENTION

Accordingly, the present invention overcomes the problems associated with existing brake-transmission interlock devices by providing a brake-transmission interlock device configured to minimize the noise associated with movement of the lever arm to and from the retracted position, and which provides uniform, precise movement. Furthermore, the present invention is manufactured with a minimum number of parts to thereby decrease manufacturing costs.

According to one aspect of the invention, a brake-transmission interlock lever assembly for use with a solenoid having an end, an exterior and a solenoid drive member includes a housing removably positioned on the solenoid's exterior and a lever arm pivotably attached to the housing, and operably connected to the solenoid drive member. Attaching the lever arm to the solenoid housing of a brake-transmission interlock device decreases the cost associated with its manufacture, and in addition, reduces the noise produced by the device as a result of less components being used in the movement of the lever arm.

According to another aspect of the invention, a brake-transmission interlock device for use with an automatic transmission vehicle having a shifter base and a shifter comprises a solenoid having a solenoid drive member, and a housing positioned on the solenoid exterior. A connector member projects from the housing, and at its end, carries a lever arm which is operably connected to the solenoid drive member. The housing includes an attachment assembly for attachment to the shifter base. The brake-transmission interlock device of the present invention provides precise movement and minimizes the noise which occurs during operation.

According to yet another aspect of the invention, a housing for a solenoid in a brake-transmission interlock device comprises a body dimensioned for sliding attachment to the solenoid exterior. The body is formed with at least one flange projecting therefrom, and has wedge shaped end. The wedge-shaped end is dimensioned for receipt by a slot formed in the shifter base. Providing a solenoid housing which utilizes the wedge-shaped end of a flange to provide secure attachment to the shifter base eliminates the need for separate nut and bolt assemblies and hence, reduces manufacturing costs. Furthermore, the use of these flanges reduces the complexity of the manufacturing process.

These and other objects, advantages, purposes, and features of the invention will become apparent upon review of the following specification in conjunction with the drawings.

DETAILED DESCRIPTION OF THE PREFERRED EMBODIMENTS

Figure 1:
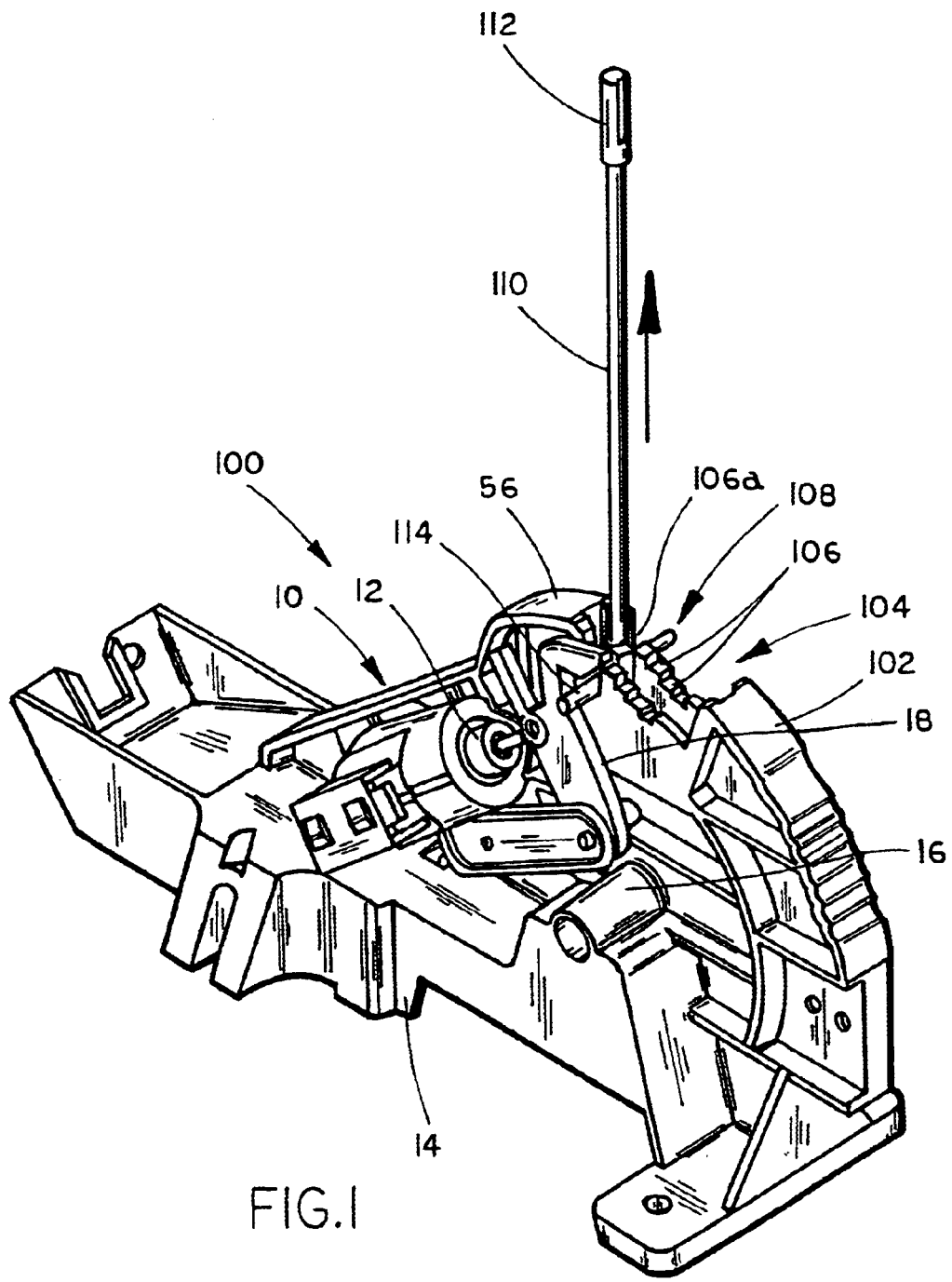
FIG. 1 is a front perspective view of a brake-transmission interlock device according to the invention.
Figure 2:
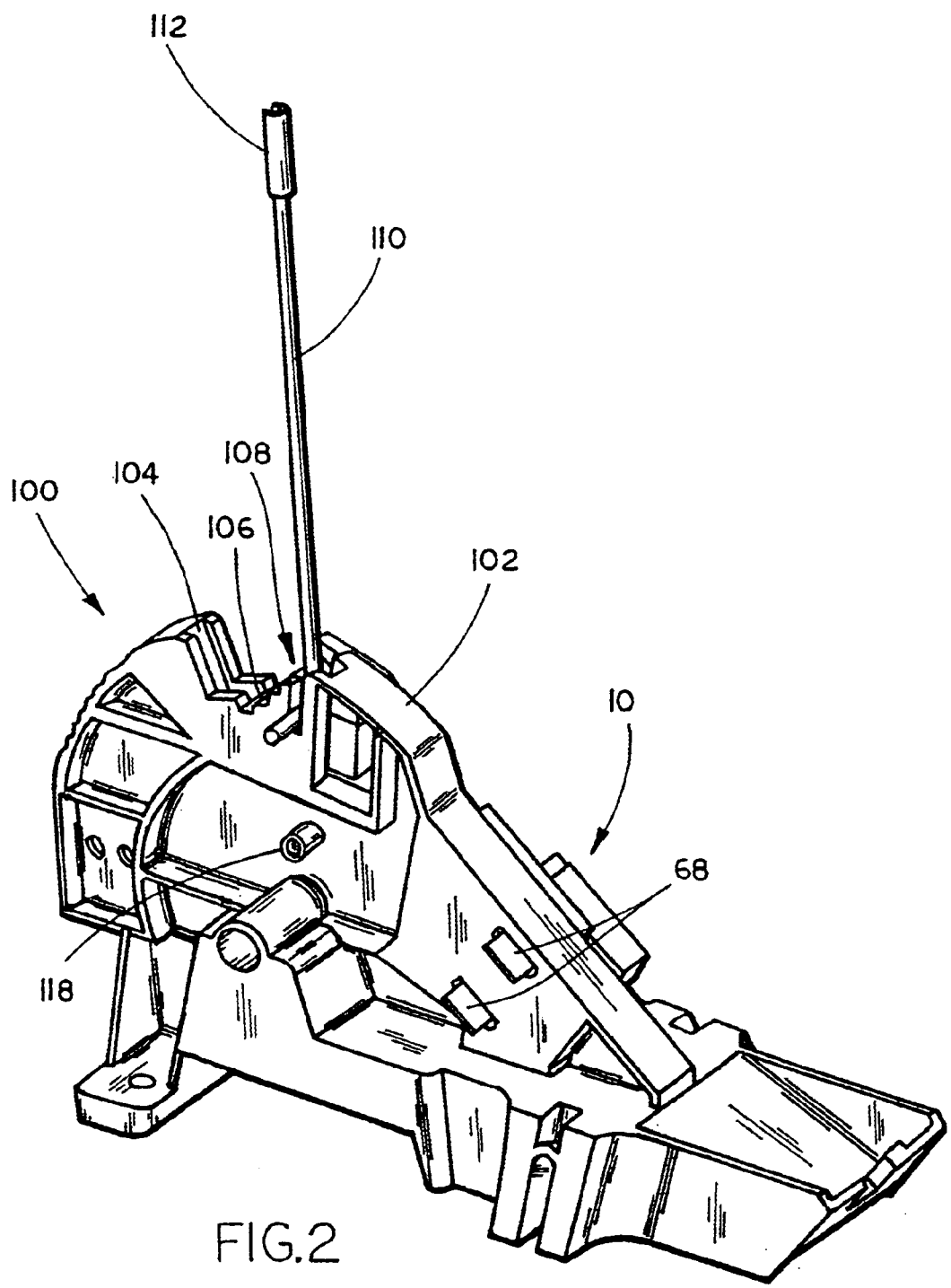
FIG. 2 is a rear perspective view of the brake-transmission interlock device of FIG. 1.

Referring now to the drawings, and the illustrative embodiments depicted therein, a brake transmission interlock device 10 for use in conjunction with an automatic transmission vehicle is shown, and as depicted in FIGS. 1 and 2, is attached to a shifter base 100. Normally, shifter base 100 of an automatic transmission vehicle has an upper region 102 formed with a cut-out section 104. Cut-out section 104 includes a plurality of notches or slots 106 which forms a shift gate 108. Removable positioned within one of slots 106 of shift gate 108 is a shift lever 110. Shift lever 110 is generally known to those with ordinary skill in the industry, and normally includes an internal spring arrangement whereby depression of an actuation member or button 112 moves a shift lever pin 114 in upward direction. Pin 114 is orthogonally attached to shift lever 110 and is dimensioned to be received by slots 106 of shift gate 108. Thus, when button 112 is depressed, pin 114 is moved in a direction indicated by the directional arrow of FIG. 1. As pin 114 clears a particular slot 106, shift lever 110 may be moved among the various slots 106 of shift gate 108 to thereby alter the position of the vehicle transmission. Shift lever 110 is normally encased within an aesthetically shaped cover or handle (not shown).

Brake-transmission interlock device 10 includes a solenoid 12, a housing 14, and a lever arm 18 carried by a connector member 16.

Figure 3:
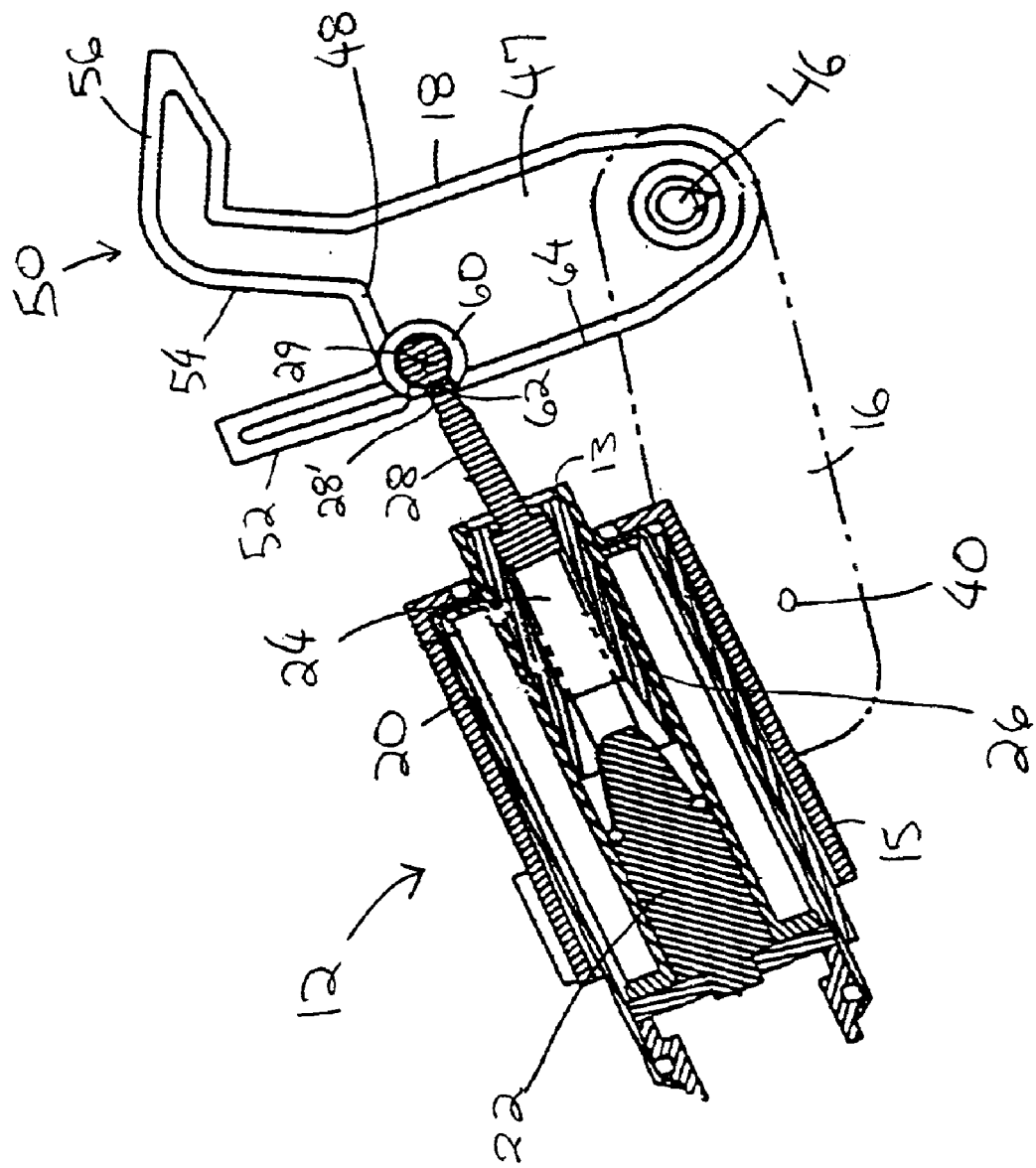
FIG. 3 is a cross sectional side view of the brake-transmission interlock device of FIGS. 1 and 2.
Figure 4:
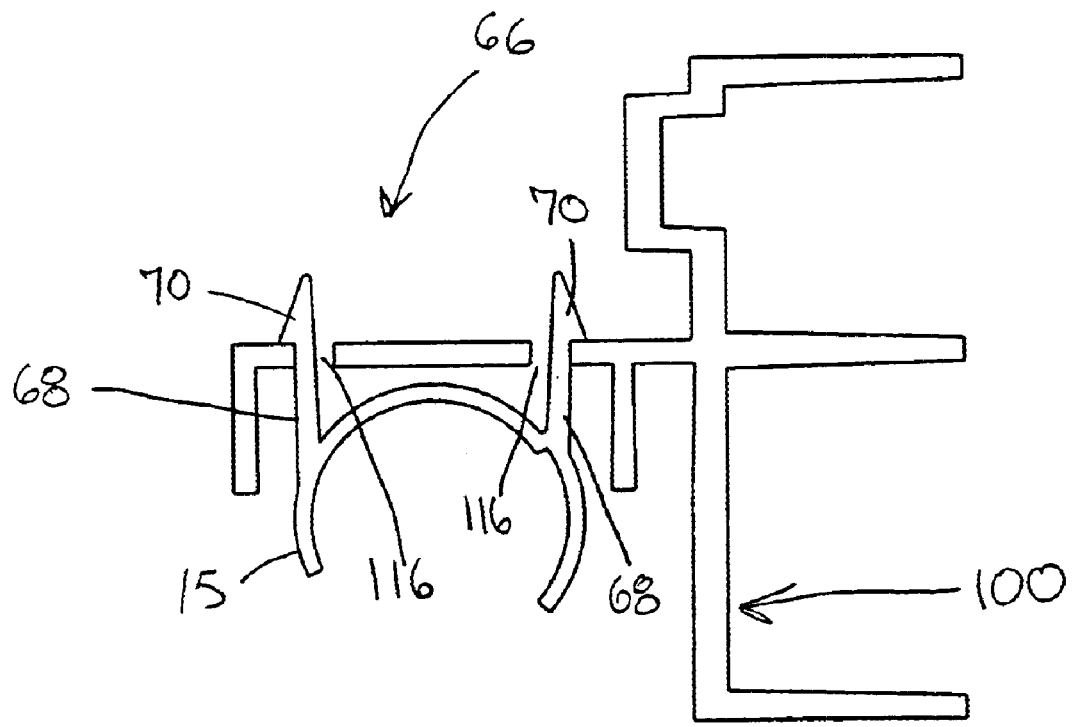
FIG. 4 is a detailed cross sectional view of the attachment of the housing to the shifter base.
Figure 5:
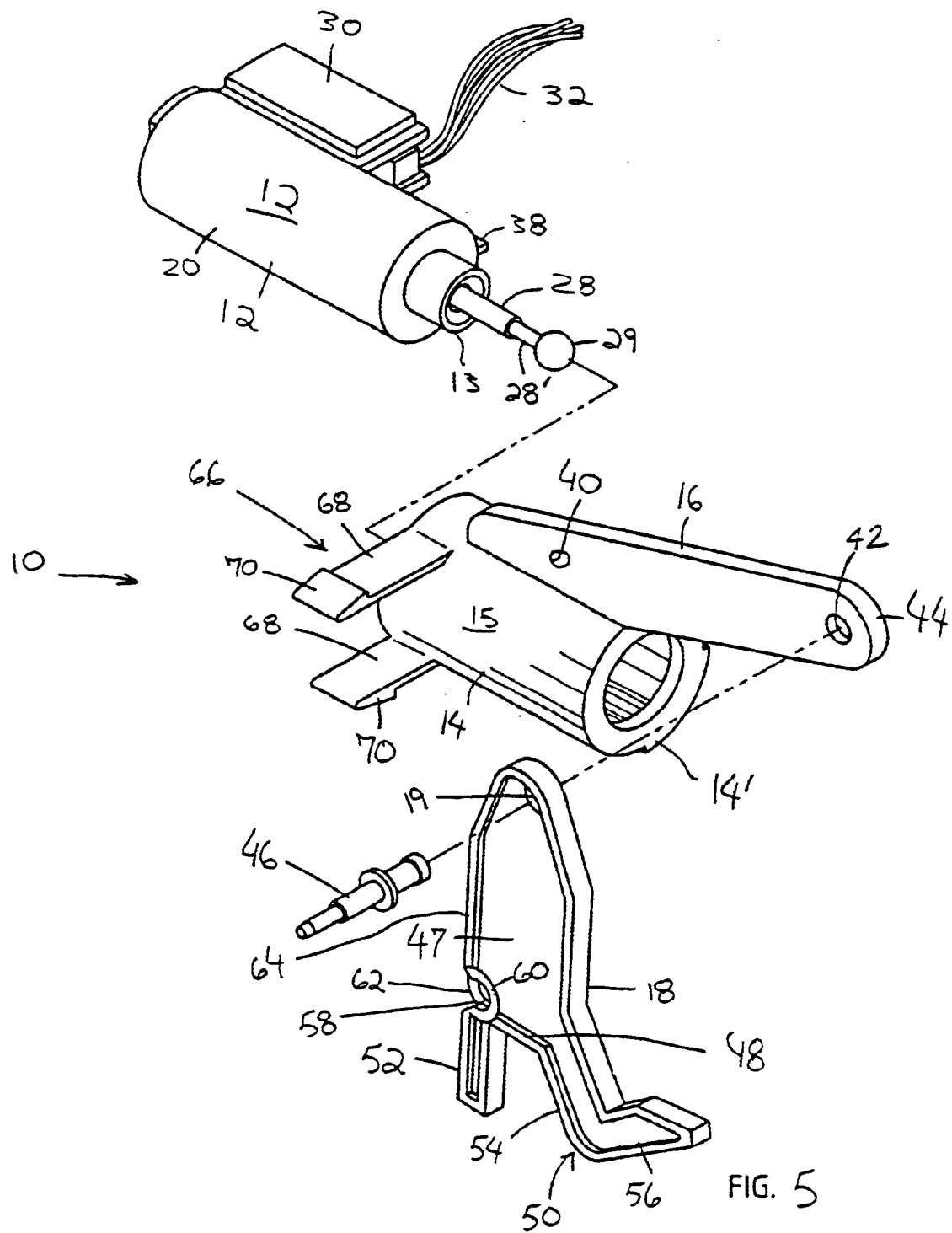
FIG. 5 is an exploded perspective view of the brake-transmission interlock device.
Figure 6:
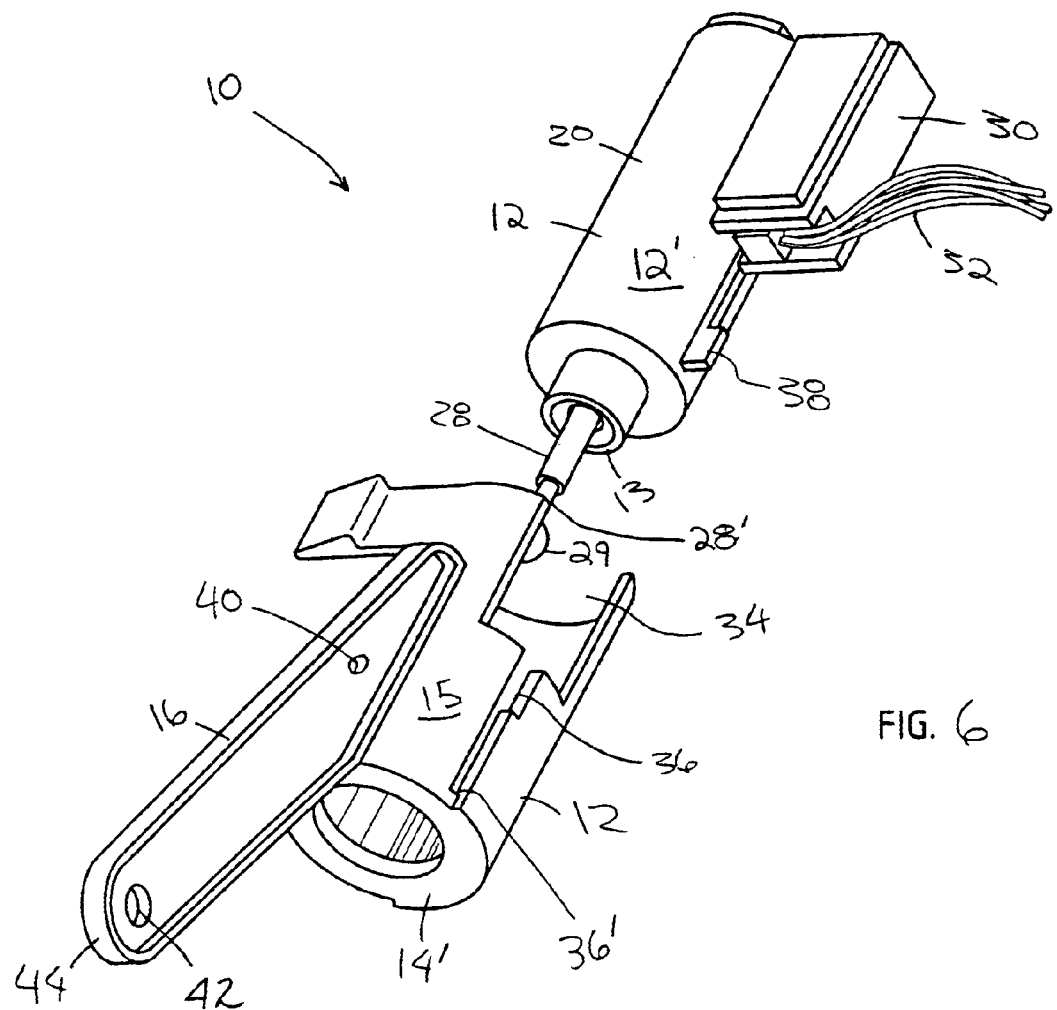
FIG. 6 is an exploded perspective view of the housing and solenoid of the brake-transmission interlock device.

Solenoid 12 is conventional in design, and as shown in FIG. 3, includes a cylindrical member 20 which houses a core 22. Positioned in operational connection with core 22 is a spring 24 surrounded by an armature 26. A solenoid drive member 28 extends beyond end 13 of solenoid 12 and is reciprocated by movement of spring 24. Solenoid 12 includes an externally mounted electrical control module 30 in electrical connection with the control system of the vehicle by means of electrical cables 32. It will be recognized by those with ordinary skill in the art, that other solenoid configurations may be substituted for solenoid 12 without departing from the spirit and scope of the invention.

Housing 14 is a body having a generally cylindrical shape so as to be contoured to the outer surface of body 20 of solenoid 12. In the illustrated embodiment, housing 14 has a generally cylindrical shape, but it will be recognized by those with ordinary skill in the art that other shapes may be utilized as long as the shape of housing 14 is contoured similar to the solenoid's exterior surface. Housing 14 is dimensioned to be slidingly and removably positioned over solenoid 12. Towards this end, housing 14 includes a cut-out section 34. When in the assembled position, control module 30 extends through cut-out section 34. A slot 36 is in communication with cut-out section 34, and dimensioned to receive member 38 projecting from solenoid 12.

Housing 14 is formed with an exterior surface 15 from which connector member 16 extends from. Connector member 16 projects beyond end 14' of housing 14 and is formed with a first aperture 40 positioned along its length and a second aperture 42, proximate to end 44. Lever arm 18 is pivotally connected to end 44 of connector member 16 by a pivot pin 46. End 48 of lever arm 18 includes a blocking member 50, and a generally linear member 52 spaced from blocking member 50. Blocking member 50 includes a first section 54 projecting from end 48 at a preselected angle. Attached to first section 54 is a second section 56 projecting at a preselected angle with respect to first section 54, and in a direction away from body 47 of lever arm 18.

Solenoid drive member 28 is formed having a spherically shaped end 29 and a section 28' having a reduced width. A circular cut-out section 58 is formed in body 46 of lever arm 18, proximate to end 48. A circular rim 60 projects from the perimeter of circular cut-out section 58. Circular rim 60 includes a slot 62 formed proximate to side 64 of body 47. Spherical end 29 of solenoid drive member 28 is dimensioned to frictionally fit and pivot within circular cut-out section 58, while the combination of the reduced width section 28' and slot 62 of the circular rim 60, enables lever arm 18 to pivot about the pivot axis defined by pivot pin 46.

Housing 14 includes an attachment assembly 66 extending from exterior 15. Attachment assembly 66 is defined by a pair of spaced flanges 68, each of which has an end 70 having a wedge shape. Flanges 68 project from exterior 15 in the same direction and are to substantially parallel.

To assemble brake-transmission interlock device 10, housing 14 is first slidingly positioned over exterior surface 12' of solenoid 12 until control module 30 is positioned within cut-out section 34 and member 38 of solenoid 12 abuttingly contacts end 36' of slot 36. Thereafter, solenoid arm 28 is operably attached to lever arm 18 by placing spherical end 29 within circular cut-out section 58 so that spherical end 29 is maintained in position by circular rim 60. In the assembled position, reduced width section 28' of solenoid arm 28 will extend through slot 62 of circular rim 60.

Attachment of brake-transmission interlock device 10 to shifter base 100 is accomplished by placing flanges 68 of attachment section 66 within a pair of spaced slots 116 formed in shifter base 100. Once in place, wedge shaped ends 70 secure housing 14 to shifter base 100. In addition, a screw, or like fastener, is threaded through first aperture 40 of connector member 16, and is threadably received by an internally threaded throughhole formed in shifter base 100. Thereafter, pivot pin 46 is inserted through second aperture 42 of connector member 15, aperture 19 of lever arm 18 and received within a raised throughhole 118 formed in shifter base 100.

In the assembled position, lever arm 18 will be positioned such that second section 56 of blocking member 50 will be oriented above pin 114 of shift lever 110. In the extended position, shown in FIG. 1, second section 56 of blocking member 50 functions to prohibit or block the movement of pin 114 from slot 106a, and thus prevents the transmission from being moved out of the park position. When an operator depresses the foot brake pedal, an electrical signal is sent to control module 30 which in turn issues a signal causing the retraction of solenoid drive member 28. The retraction of solenoid drive member 28 rotates or pivots lever arm 18 about pivot pin 46 in a direction towards end 13 of solenoid 12. When in the retracted position, pin 114 is unobstructed by second section 56 of blocking member 50, and thus enables an operator to move shift lever 110 out of slot 106a, and hence, move the transmission to an alternate position along shift gate 108.

Brake-transmission interlock device 10 is preferably formed with a minimum number of components. Specifically, preferably both housing 14, connector member 16, and attachment assembly 66 are integrally formed of a suitable material having requisite strength and rigidity. Also, preferably, lever arm 18 is formed of a unibody or one piece construction, also of a material having the requisite strength. Preferably, brake-transmission interlock device 10 is made of a suitable polymeric material.

Changes in modifications in the specifically described embodiments can be carried out without departing from the principals of the invention. Therefore, the invention is intended to be limited only by the scope of the appended claims, as interpreted according to the principals of patent law including the doctrine of equivalents.

The embodiments of the invention in which an exclusive property or privilege is claimed are defined as follows:

1. A brake-transmission interlock device for use with an automatic transmission vehicle having a shifter base and a shifter lever, the shift lever having a shift lever pin that is selectively engaged and disengaged from the shift base, said brake-transmission interlock device comprising:

a solenoid having a body and a solenoid drive member mounted for reciprocal movement in said body, said body having an exterior and an end, said drive member projecting from said end;

a housing positioned about said exterior of said body of said solenoid, said housing having an attachment assembly for attachment to the shifter base, said housing having an exterior surface, and said attachment assembly projecting from said exterior surface of said housing;

a connector member projecting from said exterior surface or said housing and extending beyond said end of said solenoid and an end of said housing; and a lever arm pivotally attached to said connector member;

wherein said solenoid drive member is pivotally mounted to said lever arm such that said solenoid drive member selectively positions said lever arm relative to said shift lever pin, wherein said lever arm prevents the shift lever pin from being disengaged from the shift base when said solenoid drive member is extended, and wherein said lever arm does not prevent the shift lever pin from being disengaged from the shift base when said solenoid drive member is retracted.

2. The brake-transmission interlock device according to claim 1, further comprising:

a pivot pin, said lever arm pivotally attached to an end of said connector member by said pivot pin.

3. The brake-transmission interlock device as recited in claim 1, wherein said solenoid drive member has a spherical end, and said lever arm has a circular cut out dimensioned to receive said spherical end to thereby interconnect said lever arm to said solenoid drive member.

4. The brake-transmission interlock device as recited in claim 1, wherein said housing and said attachment assembly are integrally formed.

5. The brake-transmission interlock device as recited in claim 1, wherein said housing and said connector member are integrally formed.

6. The brake-transmission interlock device as recited in claim 1, wherein said housing is removably positioned on said exterior of said solenoid.

7. The brake-transmission interlock device as recited in claim 1, wherein said housing is slidably positioned on said exterior of said solenoid.

8. The brake-transmission interlock device as recited in claim 3, wherein said lever arm has a first end and a second end, wherein said first end is pivotally attached to said connector member and wherein said circular cut out is positioned proximate to said second end.

9. The brake-transmission interlock device as recited in claim 8, wherein said lever arm further comprises a blocking member extending from said second at a preselected angle.

10. The brake-transmission interlock device as recited in claim 9, wherein said blocking member further comprises a first member extending from said second end, and a second member attached to said first member at a preselected angle.

11. The brake-transmission interlock device as recited in claim 10, wherein said second member of said blocking member projects in a direction away from said lever arm.

12. A brake-transmission interlock device for use with an automatic transmission vehicle having a shifter base and a shifter, said brake-transmission interlock device comprising:

a solenoid having a body and a solenoid drive member mounted for reciprocal movement in said body, said body having an exterior and an end, said drive member projecting from said end;

a housing positioned about said exterior of said solenoid, said housing having an attachment assembly for attachment to the shifter base, said housing having an exterior surface, and said attachment assembly comprising two flanges projecting from said exterior surface of said housing;

a connector member comprising a flange, said flange projecting from said exterior surface of said housing and extending beyond said end of said solenoid and an end of said housing; and a lever arm pivotally attached to said flange by a pin and interconnected with said solenoid drive member wherein extension of said solenoid drive member from said body pivots said lever arm about said pin in a first direction to limit movement of the shift lever pin and wherein retraction of said solenoid drive member pivots said lever arm about said pin in a second direction opposite from said first direction to allow movement of the shift lever pin.

13. The brake-transmission interlock device as recited in claim 12, wherein said connector member and said housing are integrally formed.

14. The brake-transmission interlock device according to claim 12, further comprising:

a pivot pin; and said lever arm pivotally attached to said connector member by said pivot pin.

15. The brake-transmission interlock device as recited in claim 12, wherein said two flanges project from said housing in generally the same direction and are substantially parallel.

16. A housing for a solenoid in a brake-transmission interlock device for use with a shifter base and a shift lever, the shift lever having a shift lever pin, the solenoid having a solenoid body and a solenoid drive member mounted for reciprocal movement in the solenoid body, the solenoid body having an exterior and an end, the solenoid drive member projecting from the end of the solenoid body, said housing comprising:

a cylindrical body dimensioned for mounting over the exterior of the solenoid body, said cylindrical body having an exterior surface and an attachment assembly projecting from said exterior of said cylindrical body, said attachment assembly comprising a pair of flanges configured to secure said cylindrical body to the shifter base;

a connector member projecting from said exterior surface of said cylindrical body and extending beyond said end of said cylindrical body; and a lever arm pivotally attached to said connector member and interconnected to the solenoid drive member, said lever arm being pivoted about said connector member to limit movement of the shift lever pin when the solenoid drive member extends and being pivoted to allow movement of the shift lever pin when the solenoid drive member is retracted.

17. The housing as recited in claim 16, wherein said body and said pair of flanges are integrally formed.

18. The housing as recited in claim 16, wherein said two flanges are substantially parallel and project in generally the same direction.

19. A brake-transmission interlock device for use with an automatic transmission vehicle having a shifter base and a shift lever, the shift lever having a shift lever pin that is selectively engaged and disengaged from the shift base, said brake-transmission interlock device comprising:

a solenoid having a body and a solenoid drive member mounted for reciprocal movement in said body, said body having an exterior and an end, said drive member projecting from said end;

a housing positioned about said exterior of said body of said solenoid, said housing having an attachment assembly for attachment to the shifter base, said housing having an exterior surface, and said attachment assembly projecting from said exterior surface of said housing;

a connector member projecting from said exterior surface of said housing and extending beyond said end of said solenoid and an end of said housing; and a lever arm pivotally attached to said connector member;

wherein said solenoid device member is pivotally mounted to said lever arm such that said solenoid drive member selectively positions said lever arm relative to said shift lever pin, wherein said lever arm prevents the shift lever pin from being disengaged from the shift base when said solenoid drive member is extended, and wherein said lever arm does not prevent the shift lever pin from being disengaged from the shift base when said solenoid drive member is retracted, wherein said lever arm includes a projecting portion for extending over the shift lever pin to thereby limit upward movement of the shift lever pin when the level arm is extended over the shift lever pin.

20. The brake-transmission interlock device according to claim 19, wherein said projection portion comprises a hooked portion.

* * * * *

UNITED STATES PATENT AND TRADEMARK OFFICE
CERTIFICATE OF CORRECTION

| | | |
|---|---|---|
| PATENT NO. | : 6,899,213 B1 | Page 1 of 1 |
| APPLICATION NO. | : 09/952415 | |
| DATED | : May 31, 2005 | |
| INVENTOR(S) | : Kurt L. Lohss | |

It is certified that error appears in the above-identified patent and that said Letters Patent is hereby corrected as shown below:

<u>Column 4:</u>
Line 27, Delete --to-- after 'are".

<u>Column 5:</u>
Line 20, Claim 1, "shifter" should be --shift--.
Line 34, Claim 1, "or" should be --of--.

<u>Column 6:</u>
Line 8, Claim 9, Insert --end-- after "second".

<u>Column 8:</u>
Line 9, Claim 19, "device" should be --drive--.
Line 20, Claim 19, "level" should be --lever--.

Signed and Sealed this

Fifteenth Day of August, 2006

JON W. DUDAS
*Director of the United States Patent and Trademark Office*